Oct. 8, 1929.                    H. I. MORRIS                    1,730,621
                           FORMING AND STRIPPING MEANS
                             Filed July 10, 1924           3 Sheets-Sheet 1

INVENTOR
Howard I. Morris
BY
ATTORNEY

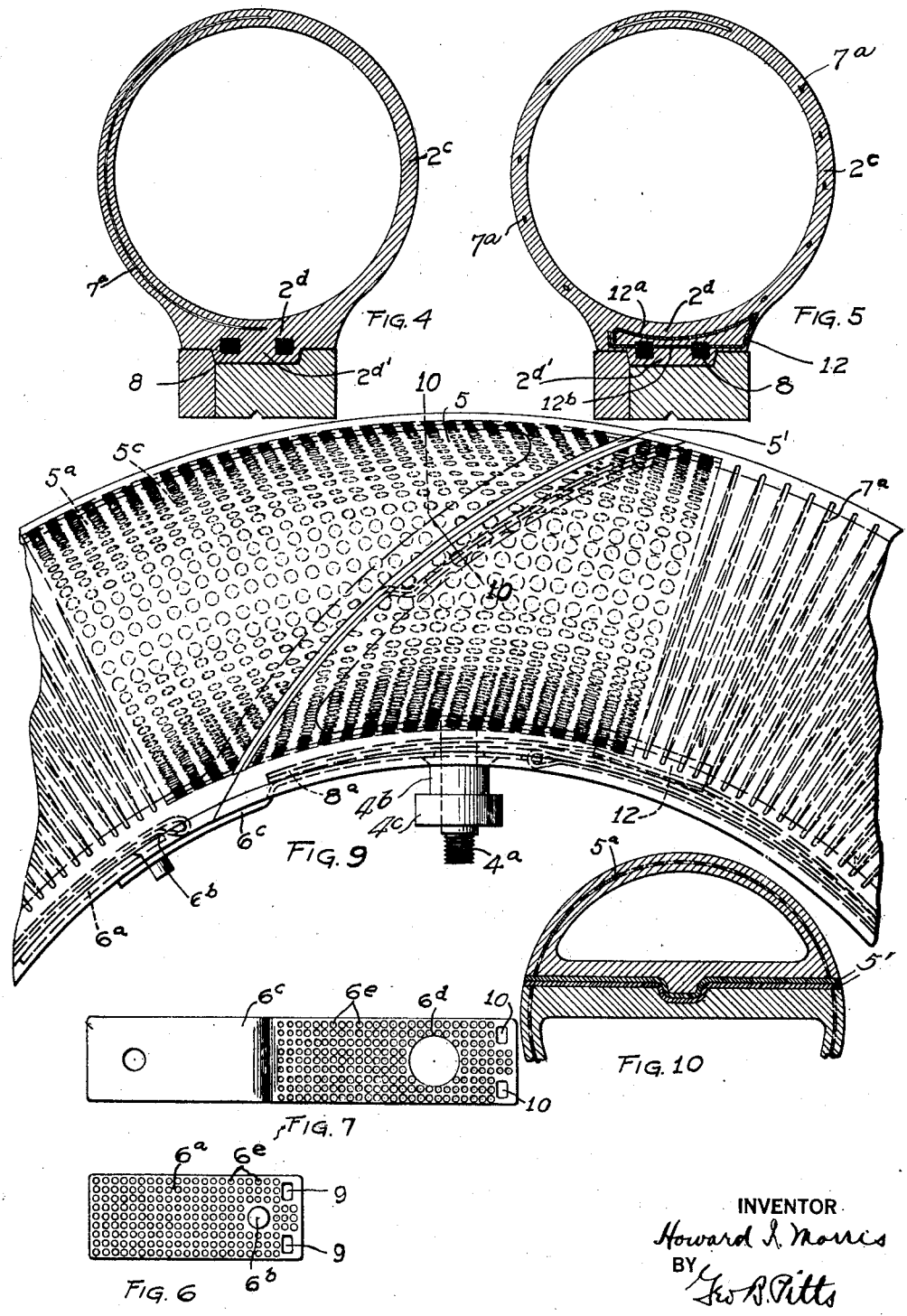

Oct. 8, 1929.   H. I. MORRIS   1,730,621
FORMING AND STRIPPING MEANS
Filed July 10, 1924   3 Sheets-Sheet 3

INVENTOR
Howard I. Morris
BY
ATTORNEY

Patented Oct. 8, 1929

1,730,621

UNITED STATES PATENT OFFICE

HOWARD I. MORRIS, OF CLEVELAND, OHIO, ASSIGNOR TO THE YODER-MORRIS COMPANY, OF CLEVELAND, OHIO, A CORPORATION OF OHIO

FORMING AND STRIPPING MEANS

Application filed July 10, 1924. Serial No. 725,190.

This invention relates to a forming member adapted for use in the manufacture of carcasses and in supporting the carcasses while being finished, either or both; that is, the member may be used in the manufacture of the carcass or to support the carcass while the operations of finishing it into a complete tire are being carried out.

One object of the invention is to provide an improved forming member or support that is relatively light, thereby enabling such member or support, with a carcass or tire thereon, to be readily handled and moved from one place to another.

Another object of the invention is to construct an improved member of flexible material whereby the carcass or tire, as the case may be, may be quickly and readily stripped therefrom.

Another object of the invention is to construct a flexible tire building member having means for strengthening the walls thereof and preventing extension of the member transversely and longitudinally.

A further object of the invention is to provide an improved supporting means for the forming member with improved interlocking means therebetween to permit the carcass or tire to be stripped or removed from the supporting means in a relatively quick manner.

Another object of the invention is to provide an improved building member or core for the manufacture of tires of a balloon or semi-balloon type, whereby the carcasses for tires of this type or the finished tires themselves may be readily removed from the building member or core.

Other objects of the invention will be apparent to those skilled in the art to which my invention relates from the following description taken in connection with the accompanying drawings.

In the following description and accompanying claims, the term "core" will comprehend a forming or building member and also a supporting member, since it may be used to support the carcass while it is being finished and it is also capable of use, if desired as a mold core; accordingly, I do not wish to be limited in the use of such term.

Fig. 4 is a section on the line 4—4 of Fig. 1.

Fig. 5 is a section on the line 5—5 of Fig. 1.

Fig. 6 is a detailed view of one of the connecting plates.

Fig. 7 is a detailed view of the other connecting plate.

Fig. 9 is a fragmentary side view of a forming member showing a further modification of the invention.

Fig. 10 is a fragmentary section on the line 10—10 of Fig. 9.

Figure 1:
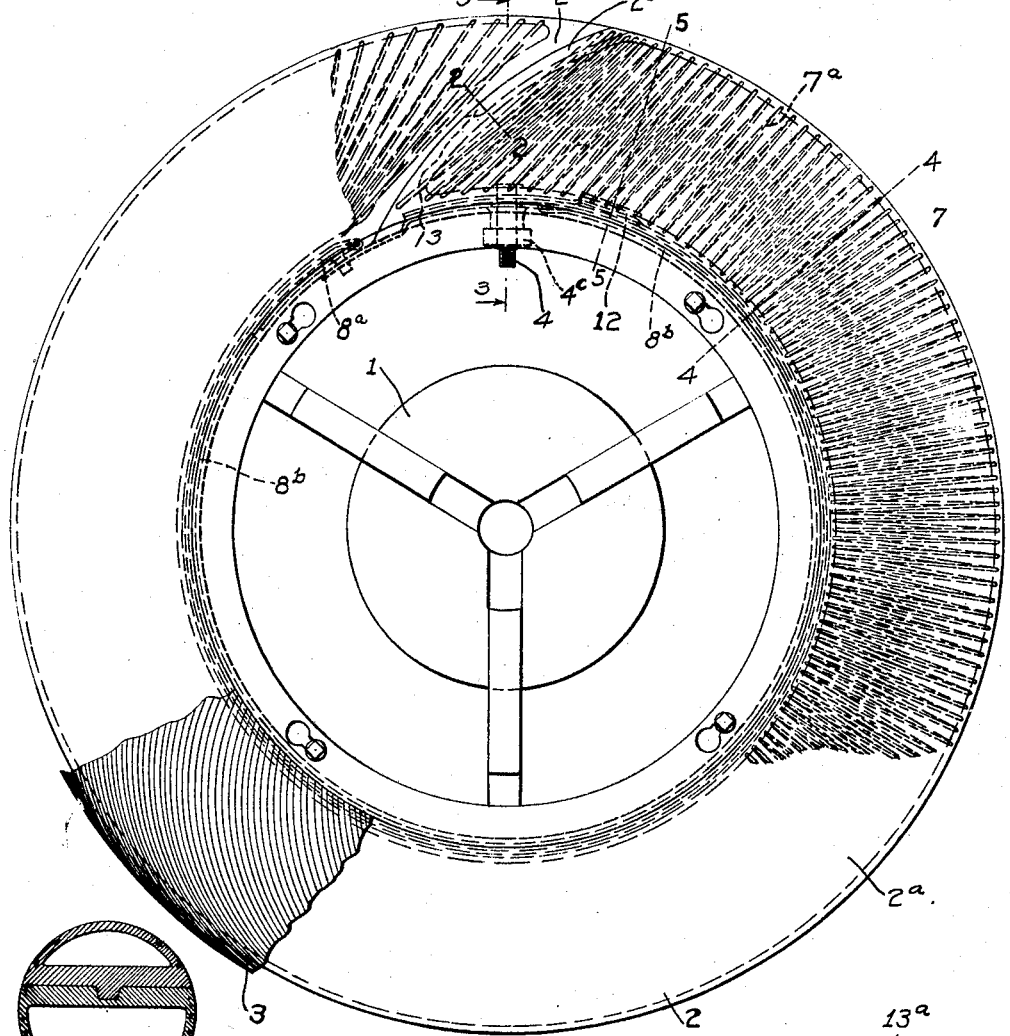
Fig. 1 is a side elevation of a forming or building member embodying my invention and a chuck on which it may be removably mounted.
Figure 3:
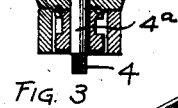
Fig. 3 is a section on the line 3—3 of Fig. 1.

In the drawings, 1 indicates a chuck of any suitable construction adapted for supporting a forming member or core, indicated as an entirety at 2, while the carcass, a portion of which is shown at 3, is being manufactured thereon.

The chuck is constructed with a rim to engage the inner edge of the forming member and such chuck or rim, or both thereof, are constructed to permit the ready assembly thereon of the forming member and its removal therefrom.

In carrying out the carcass manufacturing operations, the chuck 1 preferably forms part of a power driven machine, such as illustrated in my co-pending application filed April 10, 1924, Ser. No. 705,654, which machine is constructed to supply the carcass forming material or materials in any desired manner, and the chuck 1 is provided with a pair of clamping devices which engage the bead ends of the web—comprising the carcass forming material—that is convolutely wound on the forming member. It will be understood however that my forming member is adapted for use in the manufacture of casings by hand or other mechanism, the reference to the disclosure in applicant's co-pending application merely being for the purpose of indicating one practical application of the invention.

In practice, it is customary to manufacture the carcass on the forming member, while the latter is removably supported on a chuck; thereafter the carcass and forming member are removed to a finishing stand where the tire is finished; then the tire and forming member are placed in molds, or the tire is first stripped from the forming member and then placed in molds. In adapting my invention to such practice, the chuck on the finishing stand is preferably constructed similarly to the chuck 1, already referred to.

My invention relates to the forming or building member and the stripping mechanism therefor and by reason of the novel construction thereof, the forming member is capable of being readily and quickly stripped from the carcass or tire, as the case may be, as hereinafter set forth. To facilitate the stripping operation, I prefer to transfer the forming member with the carcass or tire thereon, as the case may be, to a supporting means or stripping mechanism, for example, such as shown in Figs. 11, 12, 13, 14 and 15, whereby the forming member may, by manual or applied power, be flexed into a spiral to effect its removal from within the carcass or tire, such operation taking place progressively from end to end of the forming or building member, so that no undue amount of force is required.

The forming member 2 preferably comprises a single length, tubular section $2^a$ having closed ends $2^b$, $2^{b\prime}$, and adapted to be filled with air or other gas or a liquid, by means of an inlet device, indicated as an entirety at 4. In practice, it is preferable to use air as the medium to inflate the tubular section $2^a$. The tubular section $2^a$ comprises a wall $2^c$ and a base $2^d$, both formed from flexible material, such as rubber, the base $2^d$ and wall $2^c$ being shaped in cross section, so far as their outer contour is concerned, to give the proper cross sectional shape to the carcass 3 while being made thereon. As shown at $2^{d\prime}$, the lower face of the base $2^d$ has a projecting member, preferably disposed midway between the sides of the base to fit into a correspondingly shaped recess in the rim of the chuck so as to be interlocked therewith against lateral movement, this form of construction being desirable to expose the sides of the base $2^d$ to permit (1) the bead clamps of the chuck 1 to engage the bead ends in the manufacture of the carcass and (2) access to the round beads in finishing the tire casing.

The ends $2^b$, $2^{b\prime}$, preferably comprise correspondingly curved walls, one being concave and the other convex, struck about an axis disposed at a point within the forming member but eccentric to its axis, so that one end of the forming member 2 may be moved relative to its other end, inwardly to commence the stripping operation and outwardly to position the forming member in its extended condition ready to be assembled on the chuck 1.

Figure 2:
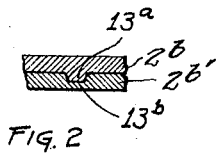
Fig. 2 is a fragmentary section on the line 2—2 of Fig. 1.
Figure 8:
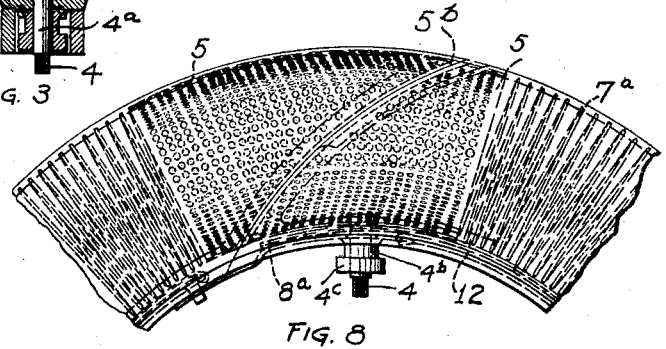
Fig. 8 is a fragmentary side view of a forming member in which the construction is slightly modified.

In the form of construction shown in Figs. 1 and 2, the end walls $2^b$, $2^{b\prime}$, are integral with the wall $2^c$ and formed from similar material, but in the form of construction shown in Figs. 8 and 9, I provide shoes 5, preferably formed from relatively nonbendable material, such as metal, suitably connected to the respective ends of the tubular wall $2^c$ and forming the end walls $2^b$, $2^{b\prime}$, already referred to. Each shoe 5 may comprise a tubular portion $5^a$, suitably embedded in the walls $2^c$, or otherwise connected thereto, and a plate or wall $5^b$, which forms one of the end walls $2^b$, $2^{b\prime}$.

The tubular portions are provided with openings $5^c$ to insure anchorage thereof in the walls $2^c$.

In the form of construction shown in Fig. 8, the plate $5^b$ is faced with rubber, which forms a continuation of the rubber material constituting the wall $2^c$ and surrounding the tubular portion $5^a$; whereas in the form of construction shown in Figs. 9 and 10, the plate $5^b$ is faced with wear resisting plates $5'$, preferably formed from steel.

To facilitate the stripping operations, as will later appear, the inlet member 4 is arranged on the under side of the forming member 2 relatively close to that end thereof having the convex wall $2^{b\prime}$.

6 indicates devices for connecting the ends of the tubular section together. The devices preferably comprise a plate $6^a$ embedded in the base $2^d$ of the section near one end thereof and supporting an inwardly projecting pin or stud $6^b$ and a plate $6^c$ embedded at one end in the base $2^d$, near its opposite end, and extending in a circumferential direction so as to overlap the joint between the end walls $2^b$, $2^{b\prime}$, and engage the pin $6^b$, the extended end of the plate being formed with an opening $6^d$ to receive the pin. The plates $6^a$ and $6^c$ are formed with a plurality of openings $6^e$ through which the rubber of the base $2^d$ extends to insure anchoring them therein. The embedded end of the plate $6^c$ is also formed with an opening through which the stem $4^a$ of the inlet device extends to anchor the plate in the section, this arrangement permitting the plate to be clamped between the expanded inner end of the stem 4ª and a collar 4ᵇ screwed on the outer end of the stem.

7 indicates a reinforcing means embedded in the wall 2ᶜ and preferably extending circumferentially thereof in a transverse direction and from end to end of the section 2ª, the purpose of such means being to prevent wear or breaking of the wall 2ᶜ and thus insure long usage, and also to prevent expansion or distortion of the wall outwardly, due to the air pressure within the tubular section, and likewise to strengthen the wall against pressure applied externally. The reinforcing means 7 preferably comprises one or more coils of resilient wire 7ª, such form of construction permitting the reinforcing means to be uniformly spaced from end to end of the section, at the inner and outer portions of the section 2ª, as well as at any and all points intermediate these portions, and readily embedded therein, and also permitting the flexing of the section inwardly and laterally, incident to each stripping operation without exerting localized strains on the wall 2ᶜ, during such operation. The wire coil 7ª is preferably disposed at all points midway between the inner and outer surfaces of the wall 2ᶜ. In the form of construction shown in Fig. 1, the coils of the wire 7ª adjacent the ends of the section 2ª are spaced closer at their outer portion and spaced farther apart at their inner portions and slightly extended in the plane of the forming member so that they can be positioned outwardly substantially to the free ends of the section formed by the walls 2ᵇ, 2ᵇ′. In the forms of construction shown in the Figs. 8 and 9, the spring 7ª may terminate at points adjacent to the inner ends of the tubular portions 5ª.

8 indicates non-extensible or reinforcement means extending along or adjacent to the inner edge of the tubular section 2ª, being preferably embedded in the base 2ᵈ. The purpose of these means is to prevent expansion or extension of the tubular section 2ª circumferentially or endwise, so that it may be maintained at a predetermined length and hence be fitted or positioned on a chuck or chucks having a diameter of a predetermined size, and thus insure uniformity in the manufacture of the carcass thereon. I preferably provide two reinforcements or non-extensible means 8 and dispose them equal distances from the center of the base 2ᵈ. Each non-extensible means may comprise bands 8ª, 8ᵇ, of woven or braided wire embedded in the material constituting the base 2ᵈ. The band 8ª extends longitudinally of the base 2ᵈ from a point adjacent the end wall 2ᵇ′ to and through an opening 9 formed in the outer end of the plate 6ª, then the band extends in the opposite direction to its starting point. The band 8ᵇ extends longitudinally of the base 2ᵈ from a point adjacent the inner end of the plate 6ª to and through an opening 10 formed in the inner end of the plate 6ᶜ; the band 8ᵇ then extends longitudinally in the opposite direction terminating at its starting point. The folds of longitudinal layers of the bands 8ª, 8ᵇ, are preferably in substantially face to face relation.

12 indicates a thrust plate or wall embedded in the base 2ᵈ and arranged in close proximity to one side wall thereof and in position to take the thrust or to resist the clamping action of the bead clamping devices already referred to when they are clamped against the bead ends. The plate or wall 12 is relatively wide and is preferably provided with arms 12ª, 12ᵇ, that are embedded in and extend transversely of the base 2ᵈ, the free ends of the arms being bent inwardly to make the anchorage of the arms in the material constituting the base 2ᵈ more secure. For this latter purpose, the arms 12ª, 12ᵇ, may be formed with openings to permit the material to project therethrough. The wall 12 is preferably curved corresponding to the adjacent face or side of the base 2ᵈ and the arm 12ª is curved to conform to the curvature of the wire coil 7ª and thus be spaced in concentric relation thereto (see Fig. 5).

It will be understood that there are two thrust plates (only one being shown) upon opposite sides of the base 2ᵈ, and preferably disposed at different points in the circumferential direction, due to the fact that the free end of the web supplied for winding on the forming member 2 is cut at an angle.

13 indicates as an entirety interlocking means between the end walls 2ᵇ, 2ᵇ′ and operating to prevent relative lateral movements between them. The interlocking means 13 preferably comprise a projection 13ª on one wall, 2ᵇ, and a recess 13ᵇ of corresponding shape on the other wall and into which the projection fits.

The projection 13ª preferably comprises a rib and the recess comprises a groove, both extending in the plane of the tubular section 2ª. The rib 13ª and recess 13ᵇ extend from the outer edges of the walls 2ᵇ, 2ᵇ′, inwardly and thus prevent relative movements therebetween. These interlocking means therefore co-operate with the connecting devices 6 to connect the ends of the section 2ª from the inner circumferential edge thereof to its outer circumferential edge.

The supporting means or stripping mechanism comprises an element adapted to engage one end of the forming member so that by (1) holding the casing 3 stationary and moving the engaging element rotatively and laterally or (2) holding the engaging element stationary and swinging the casing while moving it laterally, the flexible forming member 2 will be progressively coiled or flexed into a spiral and thus become stripped from the casing.

In the form of construction herein shown (Figs 11 to 14, inclusive) for illustrative purposes, the engaging element is held stationary and the casing 3 is bodily swung about an axis preferably disposed eccentrically to the axis of the forming member and simultaneously moved laterally, the effect of which movements is to cause the forming member 2 to wind or coil itself into a spiral and as it flexes into this condition it progressively strips itself from the casing 3. Referring to Figs. 11, 12 and 13, 14 indicates a base supporting an upright or standard 15. 16 indicates an element adapted to engage one end of the forming member 2 and hold it stationary while the casing 3 is operated in the manner described. The engaging element 16 preferably comprises a cylinder supported by the standard 15 and extending laterally therefrom. $16^a$ indicates an opening formed in the cylinder 16 and adapted to receive the collar $4^b$ of the inlet device 4. The collar is preferably provided with a projecting edge $4^c$ and the opening $16^a$ has an extended portion that is enlarged to receive the edge $4^c$ so that the latter can be disposed against the inner wall of the cylinder and detachably connect the end of the forming member and cylinder 16 together. By making the engaging element in the form of a cylinder it provides a suitable surface on which to wind the flexible member 2 when effecting the stripping operation and avoids undue wear or strain by preventing flexing thereof to an undue extent at any point or coiling of the forming member into a relatively small coil.

The cylinder 16 may be extended laterally in the opposite direction beyond the standard 15 (see Figs. 12 and 13) so that two operatives can be stripping casings simultaneously.

The cylinder 16 may be secured to the standard 15 in any desired manner.

Figure 12:
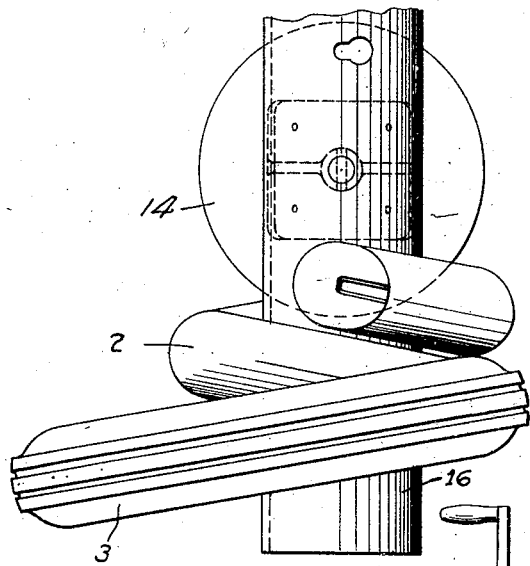
Fig. 12 is a top plan view of the parts shown in Fig. 11.
Figure 13:
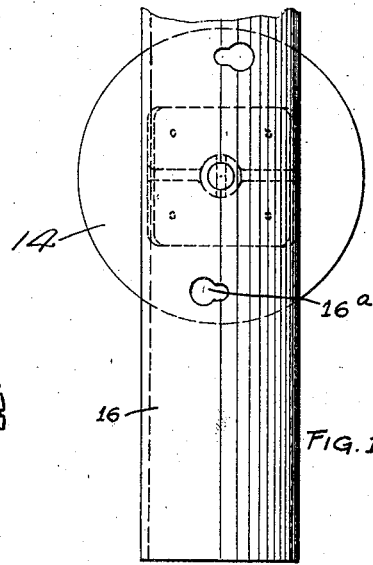
Fig. 13 is a plan view of the stripping mechanism, a portion thereof being broken away.
Figure 11:
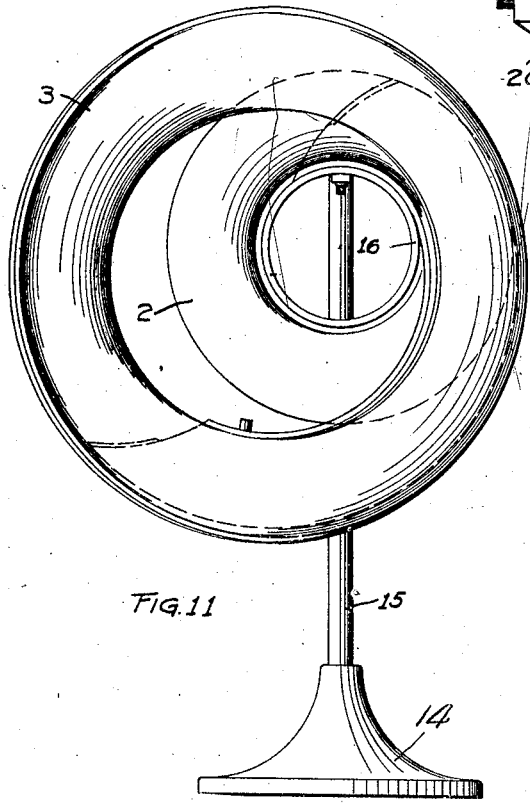
Fig. 11 is an elevation of a stripping mechanism and a casing in partially stripped position.
Figure 14:
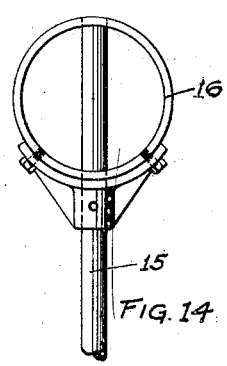
Fig. 14 is a fragmentary end view of the parts shown in Fig. 13.

In stripping the casing from the forming member, they are first removed from the finishing stand and the collar $4^b$ and projecting edge $4^c$ interlocked to the cylinder 16; then the casing is bodily swung around the cylinder 16, and moved laterally. As this operation continues, the forming member 2 wraps or coils itself around the cylinder as shown in Figs. 11 and 12, which being smaller in diameter than the casing 3, causes the forming member to progressively disengage itself therefrom. Following the stripping operation the forming member 2 may be unwound, and its opposite ends connected and then it is positioned on the chuck 1.

Figure 15:
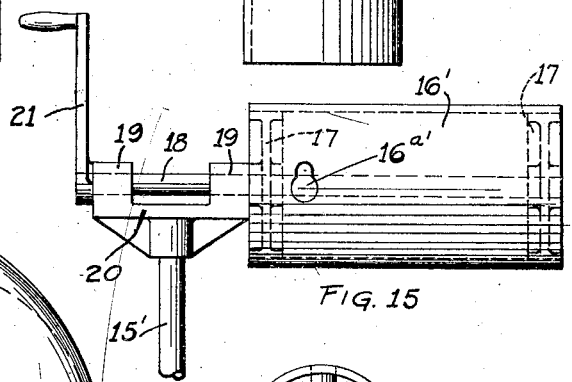
Fig. 15 is a fragmentary side view of a stripping mechanism in which the supporting drum is rotated.

When it is desired to hold the casing 3 or tire, as the case may be, stationary and to rotate the engaging element or cylinder, I construct the stand as shown in Fig. 15. In this view the cylinder 16′ is supported by one or more webs or spiders 17 upon one end of a shaft 18, which is mounted in suitable bearings 19 provided in a base 20. The base 20 is supported at the upper end of a standard 15′. 21 indicates a crank or other device fixed to the other end of the shaft 18 and adapted to rotate it in either direction.

In carrying out the stripping operation upon this form of construction, the interlocking member $4^b$ is connected with the cylinder 16′ by inserting it through the opening $16^{a\prime}$ and engaging the edge $4^c$ against the inner wall of the cylinder; then the operative moves the casing or tire laterally while preventing rotative movement thereof; at the same time the shaft 18 is rotated the effect of which is to spirally wind the forming member on the cylinder. By mounting the shaft to move axially and rotatively, the stripping operation may be effected by merely holding the casing or tire stationary. Following the stripping operation, the shaft 18 may be rotated in the opposite direction to unwind the flexible member 2 and assemble it for mounting on the chuck 1.

By reason of the fact that the stripping operation takes place progressively from end to end of the forming member 2, very little force is required to complete the operation. For this reason, the forming member readily adapts itself for use in connection with the manufacture of balloon or semi-balloon types of tires.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. A tire building member comprising a tube of flexible material having closed ends, interlocking means between the ends, means for inflating said tube with air, and means to prevent the extension of the tube both transversely and longitudinally when inflated.

2. A tire building member comprising a tube of flexible material having closed ends arranged to be engaged whereby said tube forms a continuous, annular forming member, means for inflating said tube with air, means to prevent the extension of the tube both transversely and longitudinally when inflated, and upstanding means on the side of said tube adjacent one of its ends for engagement to strip it from the tire casing.

3. A tire building member comprising a tube of flexible material having closed ends, interlocking means between said ends, means for inflating the tube with air, means to prevent the extension of the tube both transversely and longitudinally when inflated, and means for engaging said tube adjacent one of its ends to strip it from a tire casing.

4. A tire building device formed from a single continuous length tubular section of flexible material forming an annular member having a wire coil embedded in its walls with the axis of the coil coincident with the axis of the section and an integral base portion having a non-extensible band embedded therein.

5. In a device of the class described, the combination of a tire building member formed from a single continuous flexible section comprising throughout its length a tubular portion having on its under side a contiguous non-expansible base portion, and a pair of connector plates embedded in said base portion.

6. A device of the class described, the combination of a single continuous flexible section comprising a tubular portion and a base portion, a pair of connector plates embedded in said base portion, and reinforcing means embedded in said base portion.

7. In a device of the class described, the combination of a single continuous flexible section comprising a tubular portion and a base portion, a pair of connector plates embedded in said base portion, and reinforcing means embedded in said base portion and connected to the inner ends of said plates.

8. In combination with a tire building member comprising a single continuous length section formed of flexible material, and having embedded therein resilient means uniformly spaced throughout its length, means for detachably engaging one end of said section and arranged when relative rotative and lateral movements take place between the ends of said section to strip it from the tire structure.

9. A tire building member comprising a single continuous length section formed of flexible material, in combination with a support, and means for detachably connecting one end of said forming member to said support.

10. A tire building member comprising a single continuous length section formed of flexible material, in combination with a cylindrical member mounted within said section and extending laterally relative thereto, and means for detachably connecting one end of said forming member to said cylindrical member.

11. In apparatus of the class described, the combination of a tire casing building member comprising a single length hollow section having closed ends, an inlet device for fluid, whereby said section may be filled therewith, a support carrying a cylinder formed with an opening to receive said device to connect said section to said cylinder, whereby upon relative movement of the casing and cylinder the section will be stripped from the casing.

12. In apparatus of the class described, the combination of a tire casing building member comprising a single length hollow section having closed ends, an inlet device for fluid arranged near one end of said section, whereby said section may be filled therewith, a support carrying a cylinder formed with an opening to receive said device to connect one end of said section to said cylinder, whereby upon relative movement of the casing and cylinder the section will be coiled on said cylinder and stripped from the casing.

13. In a device of the class described, the combination of a tire building member formed from a single continuous flexible section, comprising throughout its length a fluid tight tubular portion having on its lower side a contiguous base portion, connecting means embedded in said base portion, and non-extensible means embedded in said base portion.

14. In a device of the class described, the combination of a tire building member formed from a single continuous flexible section comprising throughout its length a fluid tight tubular portion having on its lower side a contiguous base portion, and non-extensible means embedded in said base portion.

15. In a device of the class described, the combination of a tire building member formed from a single continuous flexible section comprising throughout its length a fluid tight tubular portion having on its lower side a contiguous base portion and connecting means embedded in said base portion.

16. In mechanism for stripping a forming member from a carcass, the combination of a support, and a cylinder projecting laterally therefrom and adapted to support a forming member and a carcass thereon, said cylinder being provided with means permitting the forming member to be connected thereto.

17. In mechanism for stripping a forming member from a carcass, the combination of a support, a shaft mounted to rotate on said support, a cylinder connected to said shaft and projecting laterally therefrom and arranged to receive a forming member, means carried by said cylinder permitting one end of said forming member to be connected thereto, and means for rotating said shaft.

In testimony whereof, I have hereunto subscribed my name.

HOWARD I. MORRIS.